(12) United States Patent
Brown et al.

(10) Patent No.: US 6,475,933 B1
(45) Date of Patent: Nov. 5, 2002

(54) HIGHLY CONDUCTIVE ELASTOMERIC SHEET

(75) Inventors: Mark David Brown, San Pedro, CA (US); John Wilbur Tully, Rolling Hills Estates, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/491,734

(22) Filed: Jan. 27, 2000

(51) Int. Cl.⁷ .................. B32B 27/04; B32B 27/12; B32B 15/06; B32B 15/08; B32B 25/02
(52) U.S. Cl. .................. 442/44; 442/1; 442/2; 442/6; 442/15; 442/19; 442/29; 442/37; 442/43; 442/110; 442/111; 442/228; 442/229; 442/237; 428/295.1; 428/297.4; 428/372; 428/402
(58) Field of Search .................. 428/295.1, 297.4, 428/372, 402; 442/1, 2, 6, 15, 29, 19, 37, 44, 43, 110, 111, 228, 229, 237

(56) References Cited

U.S. PATENT DOCUMENTS

| | | |
|---|---|---|
| 1,225,289 A | 5/1917 | Sweetland |
| 2,111,229 A | 3/1938 | Thompson |
| 3,666,876 A | 5/1972 | Forster |
| 3,968,296 A | 7/1976 | Nopper et al. |
| 4,104,480 A | 8/1978 | Thompson |
| 4,303,735 A | 12/1981 | Kehrer et al. |
| 4,518,648 A | 5/1985 | Miyata et al. |
| 4,567,094 A | 1/1986 | Levin |
| 4,725,693 A | 2/1988 | Hirsch |
| 4,752,415 A | 6/1988 | Iwaskov et al. |
| 4,882,089 A | 11/1989 | Iwaskov et al. |
| 4,970,488 A | 11/1990 | Horiike et al. |
| 6,075,205 A * | 6/2000 | Zhang .................. 174/35 |
| 6,331,349 B1 * | 12/2001 | Kalinoski et al. .......... 428/220 |

* cited by examiner

Primary Examiner—Elizabeth M. Cole
Assistant Examiner—Ula C. Ruddock
(74) Attorney, Agent, or Firm—Stetina Brunda Garred & Brucker

(57) ABSTRACT

Highly conductive elastomeric sheet. Preferably, the conductive elastomeric sheet comprises a conductive wire mesh loaded into an elastomeric matrix from which is also loaded with a conductive particulate. Preferably, the particulate comprises carbon particulate having a sub-micron size, and is present in an amount between ten percent (10%) to twenty percent (20%) by volume. The conductive elastomeric materials are exceptionally durable and retain a high degree of conductivity well-after ten thousand (10,000) fatigue performance cycles.

13 Claims, No Drawings

HIGHLY CONDUCTIVE ELASTOMERIC SHEET

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

Among the most elusive goals in materials science has been the development of sheeting material that is both highly conductive and elastic. As is well recognized in the art, such properties are highly desirable in a number of applications, and in particular the construction, maintenance and repair of aircraft. In this regard, the property of high conductivity is important to provide absorption and shielding of electromagnetic radiation. The property of elasticity in contrast is necessary to resist the harsh environment such materials are subjected to, particularly with respect to aerospace applications, which necessarily requires that such materials possess sufficient material durability and reliability.

As is well-recognized by those skilled in the art, however, the materials that must be utilized to impart such properties, namely conductivity and elasticity, poorly complement one another. Specifically, highly conductive materials generally lack elasticity, and the incorporation of such conductive materials with materials that are elastic, such as rubbers and silicones causes the result in compound to become less elastic. In this regard, the actual strain on the matrix increases proportionally as the matrix material becomes increasingly displaced by loading material, which particularly comprises conductive particulates. Furthermore, it is recognized that the matrix experiences a substantially reduced tear strength, and hence reducing the ultimate yield strength, as conductive particulates become increasingly loaded therein.

In order to produce a greater amount of elasticity, attempts have been made to incorporate conductive wire meshes or metalized organic meshes into an elastomer base or matrix to thus produce a result in conductive elastomer. Generally, the elasticity of such meshes is depended upon the strain direction, and it is known in the art that a variety of weaves and nets can be used to create a desired mesh for a desired application.

Notwithstanding the slightly enhanced performance of such conductive elastomers incorporating conductive wire meshes, cyclic fatigue testing of such materials has identified that the resistivity thereof increases over time. In this regard, most conductive wire mesh elastomers have been shown to produce unacceptable resistivity after as few as five thousand (5,000) cycles. Further disadvantages are the fact that such conductive wire mesh elastomers experience greater wear and fatigue than non-conductive elastomer materials. For example, a typical conductive elastomer, such as Ni/Ag coated bi-directional scrim loaded in a silicone matrix at twenty-five percent (25%) strain and fifteen-percent (15%) strain, respectively, after five-thousand (5,000) cycles experiences the following increases in resistivity.

TABLE 1

| Sample | Initial Resistance (Ohms/sq) | Final (relaxed) Resistance | Initial (at strain) Resistance | Final (at strain) Resistance |
| --- | --- | --- | --- | --- |
| (1) (25% strain) | 0.55 | 3.00 | 1.05 | 11.0 |
| (2) (15% strain) | 0.55 | 1.75 | 0.80 | 3.15 |

As will be noted, the resistance of the Ni/Ag scrim elastomeric sheet increases nearly six-fold in the relaxed state, and nearly eleven-fold whole in the strained state when tested at twenty-five percent (25%) strain. Significant increases are also noted in samples having undergone testing at fifteen percent (15%) strain, as illustrated.

Accordingly, there is a substantial need in the art for a highly conductive elastomeric sheet that possesses sufficient durability and retains high conductivity after having undergone repeated cyclical exposure to strain cycles of up to twenty-five (25%). There is a further need for such highly conductive elastomeric sheet that can be readily utilized for a variety of commercial applications, and in particular the manufacturer, maintenance and repair of aircraft. Still further, there is a need in the art for a highly conductive elastomeric sheet that, in addition to possessing and retaining high conductivity and elasticity, can be readily formulated and fabricated from commercially-available materials.

BRIEF SUMMARY OF THE INVENTION

The present invention specifically addresses and alleviates the above-identified deficiencies in the art. In this regard, the present invention comprises a highly conductive elastomeric sheet that is substantially more durable and has a significantly more durable and has a significantly longer life than prior art conductive elastomers. According to a preferred embodiment, the conductive elastomeric materials of the present invention comprise the combination of a highly conductive mesh and a sub-micron sized particulate loaded into an elastomeric matrix. The conductive mesh may take any of a variety known in the art, including those formed from NI/Ag and may be further woven to assume any of a variety known in the art. The sub-micron sized particulate preferably comprises carbon particles present in an amount of approximately 10 to 20% by volume and in a more highly preferred embodiment, ten percent (10%) by volume. Advantageously, the conductive elastomers of the present invention retain superior conductivity in both relaxed and strained states (e.g., fifteen percent (15%) and twenty-five percent (25%) elongation) well-over ten thousand (10,000) cycles. The conductive elastomeric materials of the present invention have further retained superior conductivity in both relaxed and strained states over as many as seventy-five thousand (75,000) cycles.

It is therefore an object of the present invention to provide a highly conductive elastomeric material that is highly durable and retains a high degree of conductivity over repeated cyclical exposures to strain.

Another object of the present invention is to provide a highly conductive elastomeric material that is substantially more durable than prior art conductive of elastomeric materials.

Another object of the present invention is to provide a highly conductive elastomeric material that may be readily formulated and fabricated from conventional, commercially-available materials.

Another object of the present invention is to provide a highly conductive elastomeric material that can be ideally used in aerospace applications, and in particular the construction, maintenance and repair of aircraft.

Still further, another object of the present invention is to provide a highly conductive elastomeric material that is of low cost to manufacture, does not utilize costly materials and may be readily utilized.

DETAILED DESCRIPTION OF THE INVENTION

The following detailed description is provided for the purpose of describing certain presently preferred embodiments of the invention only, and are not intended to limit the scope of the claimed invention in any way.

The present invention is directed to novel highly conductive elastomeric materials that possess and retain a high degree of conductivity and durability than other prior art materials. According to a preferred embodiment, the conductive elastomeric materials of the present invention comprise a conductive wire mesh or metalized organic mesh that is loaded into an elastomeric matrix. In a preferred embodiment, the conductive wire mesh may comprise a metallic scrim, such as a Ni/Ag coated bidirectional scrim, well-known to those skilled in the art.

As will further be appreciated by those skilled in the art, the conductive wire meshes or metalized organic meshes may conform to any variety of weave knit patterns in order to resist stress and strain in one or multiple directions. In this regard, it will be understood that most conventional conductive meshes may be formed to have elasticity dependant upon strain direction and that any variety of weaves and knits can be used to create a desired mesh. Along these lines, it will be particularly noted that any of a variety of weaves and knits known in the art may be utilized to produce better elasticity and strain that are independent of strain direction.

The elastomeric matrix, similar to the conductive mesh, may likewise be selected from any variety known in the art. In this regard, such elastomeric matrix may be selected from any of a variety of rubbers and silicones that are known to possess sufficient durability and resilience in cyclic fatigue testing.

Unlike prior art compositions, however, the present invention further includes the addition of conductive particulates that are loaded within the elastic matrix. Preferably, the conductive particulates comprise carbon particulates present in an amount ranging from 10 to 20% by volume of the resultant matrix. In a more highly preferred embodiment, the carbon particulate is present in an amount of approximately ten percent (10%) by volume.

The carbon particulate is preferably formed to have a sub-micron size. In this regard, the carbon particulate is presently formed to have a size of between 0.02 to 0.03 microns in diameter. In a more highly preferred embodiment, the carbon particulate has a mean diameter size of approximately 0.025 microns.

Preferably, the conductive elastomeric materials of the present invention may be formed as per conventional manufacturing practices. In this regard, it is currently contemplated that the conductive elastomeric materials of the present invention are preferably formed by first loading the conductive wire mesh into the elastic matrix, and thereafter adding the carbon particulate. In so forming the conductive elastomeric materials of the present invention, the appropriate volume of the resultant matrix may be monitored to ensure a proper amount of carbon particulate content.

Advantageously, the highly conductive elastomeric materials of the present invention are shown to have a resistivity below of one (1) Ohm per square inch. Remarkably, the conductive elastomeric materials of the present invention are capable of surviving seven-five thousand (75,000) cycles of twenty-five percent (25%) elongation strain with an increase resistivity of up to only 1.7 Ohms per square inch. As will be recognized by those skilled in the art, such minimal resistivity is much lower than can be obtained via prior art materials, and in particular pure particulate loaded of elastomer. Moreover, such materials have a substantially longer cyclical life than may be obtained with conductive fiber encapsulated in an elastomer.

As shown in Table 2 herebelow, the sheet resistance of a Ni/Ag scrim elastomeric sheet having sub-micron particulate carbon loaded therein up to ten percent (10%) by volume is shown after ten thousand (10,000) cycles.

TABLE 2

| Sample | Initial Resistance (Ohms/sq) | Final (relaxed) Resistance (Ohms/sq) | Initial (25% strain) Resistance (Ohms/sq) | Final (25% strain) Resistance (Ohms/sq) |
|---|---|---|---|---|
| FSL-2 | 0.35 | 0.70 | 0.60 | 0.90 |
| FSL-3 | 0.45 | 0.70 | 0.60 | 1.05 |

As will be appreciated by those skilled in the art, the conductive elastomeric materials of the present invention possess low resistant in both the relaxed and strained states, unlike prior art compositions.

Although the invention has been described herein with specific reference or a presently preferred embodiment thereof, it will be appreciated by those skilled in the art that various modifications, deletions and alterations may be made to such preferred embodiment without departing from the spirit and scope of the invention. Accordingly, it is intended that all reasonable foreseeable additions, modifications, deletions and alterations be included within the scope of the invention as defined in the following claims.

What is claimed is:

1. A highly elastomeric material having an elasticity and a conductivity comprising:
  a) an elastomeric matrix;
  b) a conductive mesh disposed within said matrix; and
  c) a conductive particulate also disposed within said matrix for retaining the elasticity of the material, and substantially maintaining the conductivity of the material in both a relaxed and strained state after subjecting the material to cyclical elongation strain, wherein said conductive particulate has a diameter ranging between 0.02 to 0.03 microns.

2. The highly elastomeric material of claim 1 wherein said elastomeric matrix comprises a rubber.

3. The highly elastomeric material of claim 1 wherein said elastomeric matrix comprises a silicone.

4. The highly elastomeric material of claim 1 wherein said conductive particulate comprises carbon particulate.

5. The highly elastomeric material of claim 4 wherein said conductive particulate has a sub-micron size, the particulate being formulated within the matrix to maintain substantially constant matrix elasticity throughout a cross section of the material.

6. The highly elastomeric material of claim 1 wherein said conductive particulate has a mean diameter of approximately 0.025 microns, the particulate being sized to main tain sufficient elastomeric matrix continuity along its elongation length.

7. The highly elastomeric material of claim 1 wherein said conductive particulate is present in an amount from 10 to 20% by volume.

8. The highly elastomeric material of claim 7 wherein said carbon particulate is present in an amount of approximately 10% by volume.

9. The highly elastomeric material of claim 1 wherein the mesh is formulated to substantially maintain the elasticity of the material during repeated elongation and relaxation of the material.

10. The highly elastomeric material of claim 9 wherein the mesh is a conductive mesh.

11. The highly elastomeric material of claim 10 wherein said conductive mesh comprises a conductive wire mesh.

12. The highly elastomeric material of claim 11 wherein said conductive mesh comprises a conductive metalized organic mesh.

13. The highly elastomeric material of claim 11 wherein said conductive mesh is formed to have a woven pattern.

* * * * *